United States Patent Office

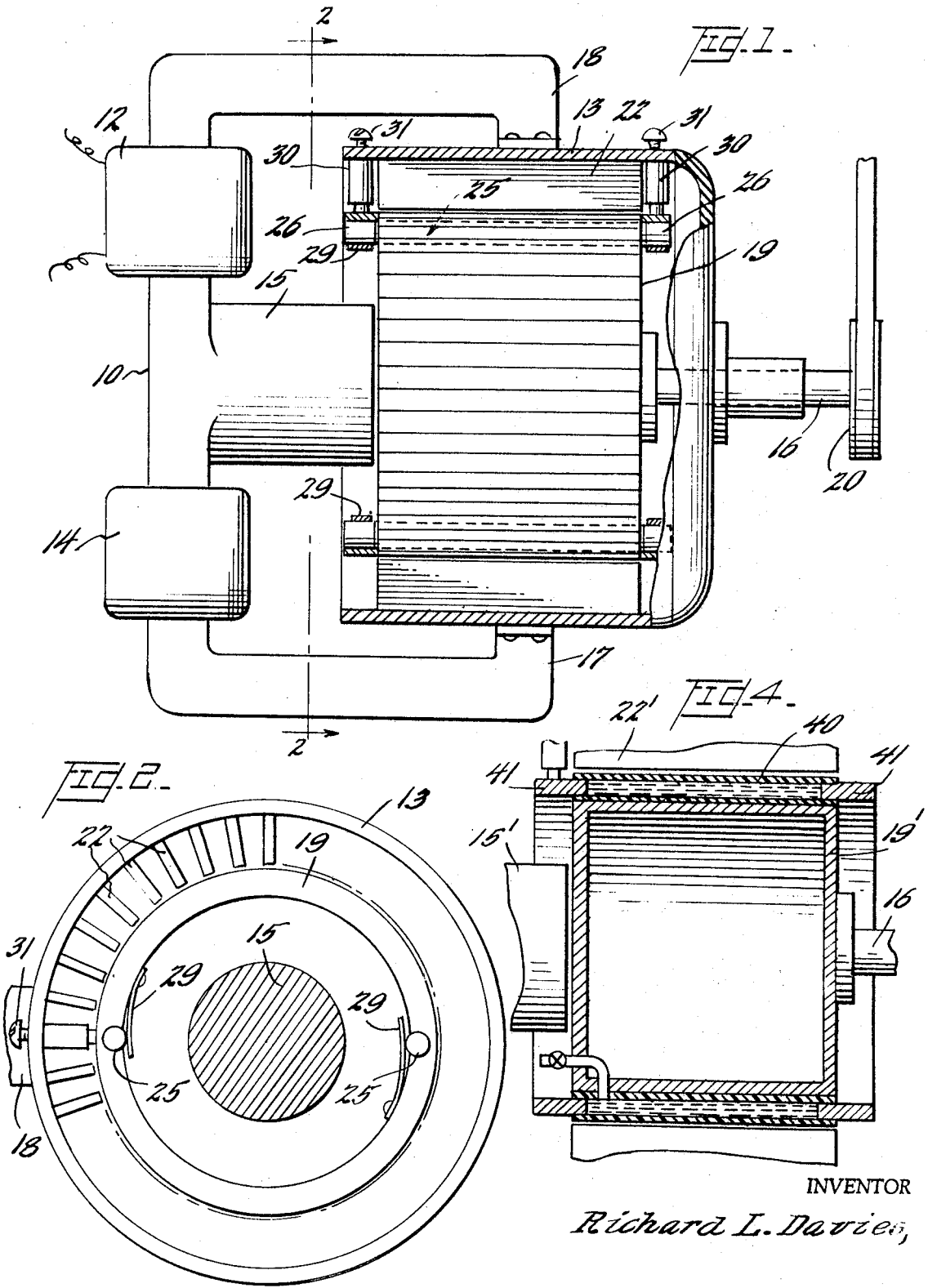

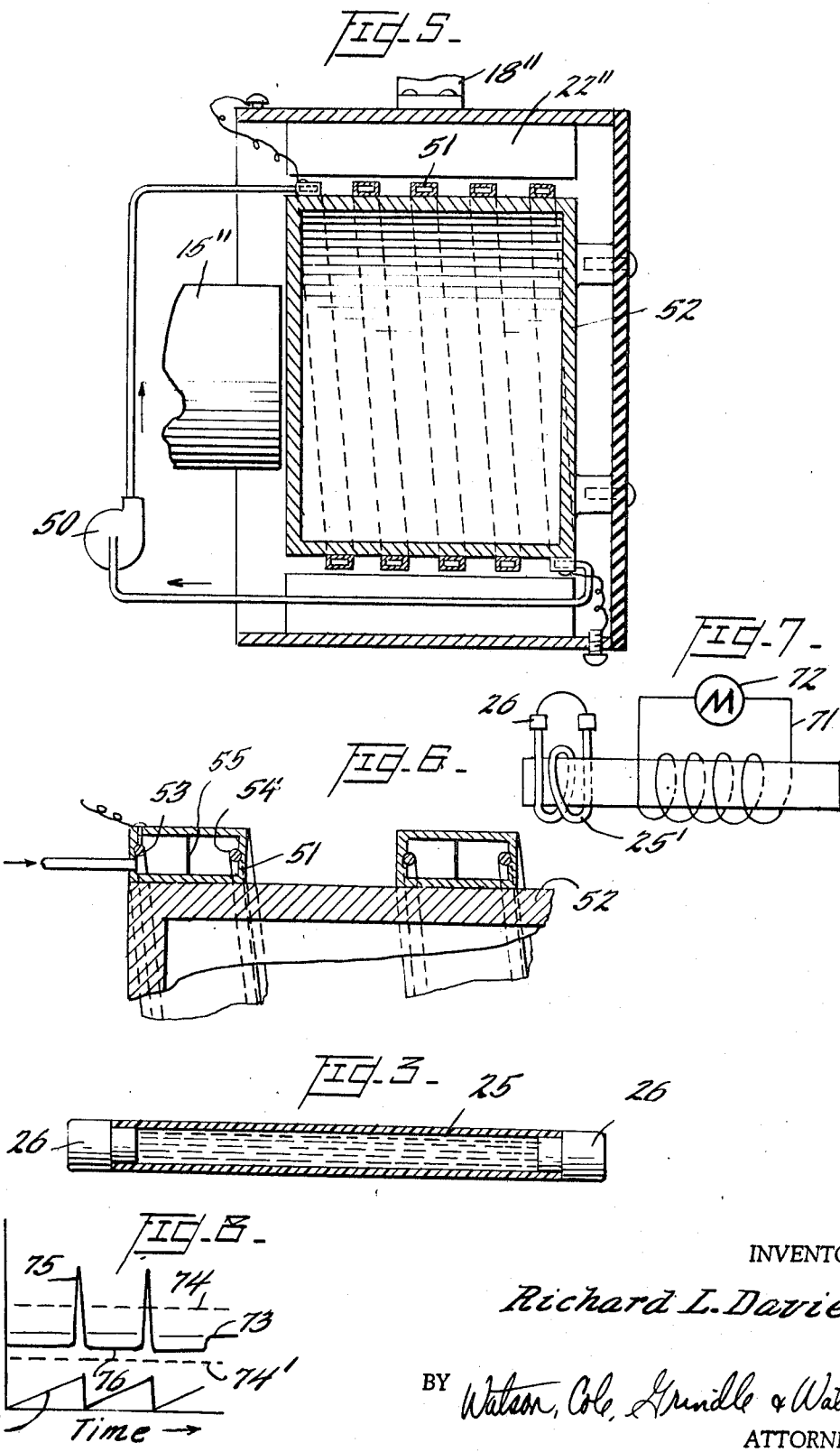

3,522,162
Patented July 28, 1970

3,522,162
ELECTROLYTIC REACTIONS UNDER INFLUENCE
OF MAGNETIC FIELD
Richard L. Davies, 3206 P St. NW.,
Washington, D.C. 20007
Filed Feb. 18, 1965, Ser. No. 433,549
Int. Cl. B03c 1/02
U.S. Cl. 204—180                                    12 Claims

ABSTRACT OF THE DISCLOSURE

Method and apparatus to cause migration of ions or electrically charged particles in a solution by passing a body of solution through and cutting a magnetic field. Magnetic field is generally radial and containers are spun through said field so as to cut the field at such a speed as to urge particles towards opposite sides of the container.

---

This invention relates to a process and apparatus for providing chemical reactions such as electroplating and generation of gaseous substances, and the relative separation of different chemicals in a solution by such methods as electro-phoresis, electro-dialysis and electro-osmosis. More particularly the invention relates to a novel means of supplying energy for accomplishing the electrolytic reaction.

It has been conventional in the prior art to use a battery or a direct current generator source to supply electrical energy through conductors to a pair of electrodes immersed in an electrolytic solution whereby electrolytic reactions are affected. With this process electrolytic reaction depends upon the creation of an electrostatic field which has greatest effect in the area immediately surrounding the electrodes and thus causes the positive and negative ions to migrate through the solution towards the oppositely charged electrodes. At the positive electrode negative ions give up electrons resulting in the formation of chemically oxidized products while at the negative electrodes positive ions receive electrons resulting in the formation of chemically reduced products. There are no satisfactory means in common use in the prior art for obtaining control over electrolytic reactions by supplying electrical energy directly to the electrolyte solution and the ions without electrodes.

This prior art conventional technique has introduced certain drawbacks, as for example, the manner of obtaining uniform plating. When direct current is first supplied to electrodes immersed in an electrolyte, the initial migration of ions and plating action, in this case, on the electrodes takes place at a very rapid rate. This is in response to an initial surge of high current. This initial high rate however cannot be maintained since the electrostatic field in the electrolyte and electrode configuration have changed as ions flow into a more stable pattern to assume a virtual electrode effect in the vicinity of the electrode. This effect in essence is caused by the high density of ions which have migrated to the vicinity of each of the electrodes so that an electric field gradient is produced. A shielding effect results which in essence causes a reduction in the flow or general migration of ions towards the electrodes and reduces the effectiveness of the potential source connected to the electrodes. Also the charge at the interface of the electrode may itself disturb the electrolytic reaction and the potential gradient which causes ions to migrate through the solution.

It is accordingly an object of the present invention to provide a source of energy which will produce a potential gradient independent from the virtual electrode effect and electrode interface reactions and produce a pattern determined by the potential source applied to the electrolytic solution. In this manner a potential gradient of any desired pattern may be accomplished in contradistinction to the patterns obtained in the prior art by the use of potentials developed by a D-C source to a pair of electrodes.

Furthermore there are many sorts of electrolytic reactions that are not convenient or feasible with the prior art operation where electrodes are required in the solution. For example, if one is to generate fluorine, it is difficult to find any conductive electrode which will not be attacked by the fluorine. Thus the electrodes are subjected to undesirable reactions, and even if electrodes such as platinum can be found which will not be subjected to such reaction, they are expensive and not entirely satisfactory when used.

Another example of an occasion which could be more convenient without the use of electrodes is the requirement to form electrically reduced or oxidized substances directly at a surface that is not connected to an external potential source to serve as an electrode. It has not been possible in the past to obtain satisfactory results in electrolytic reactions without the use of electrodes, and such operation has had to be provided by alternative methods.

If for example it is desired to obtain electrolytic oxidations and reductions of organic compounds, where it is desired to concentrate various compounds and/or rates of reaction in different zones of the electrolyte, this method has a significant advantage. Since the electric field is by this invention induced in the electrolyte in connection with a magnetic field, the magnetic field pattern can be shaped to produce variations in the concentration of the electric field through various zones in the electrolyte.

Thus in accordance with the present invention the source of electrical energy used for obtaining an electrolytic reaction and for causing migration of ions to the region at which electrolytic reaction takes place is the movement of an electrolyte with respect to a magnetic field. Thus a potential difference may be generated therein having a defined potential gradient. In this manner the potential difference within the electrolyte solution may be selected by well known relationships between the magnetic field and moving charges. In such a manner ions can be made to move within the electrolyte in a direction perpendicular to the movement of the electrolyte through a magnetic field, with such ion movement being in a direction dependent upon the polarity of the magnetic field. In this manner ions of different polarity will migrate to opposite extremes of a container which confined the electrolyte solution as it moves through the magnetic field. Because of the concentration of such ions at the extremes of the container, surfaces may be prepared therein for receiving a plating or for encouraging the generation of gas, or for other electrolytic and physical reactions. These surfaces may comprise conductors connected into a closed circuit path.

In accordance with this invention conductive electrodes are electrically connected together by means of a conductor. The method may be used with or without external supplemental batteries or other direct current sources supplementing the field induced by magnetic action. Thus, when electrodes at the two opposite surfaces receive the ions of opposite polarity and are conductively connected together, they will receive their desired charges by conduction from the opposing electrode through the return external conducting path between the electrodes to enhance the plating operation. Thus in accordance with the invention even the provision of migration of ions within the solution can be effected solely under the influence of the magnetic field on the electrolyte solution moved therethrough. In this invention the effect on migration of ions in the intermediate regions between electrodes is not limited by the "virtual" electrode effect of prior art methods since the energy supplied to the ions in the intermediate regions is from the magnetic field. Thus the invention provides for an improved electrolytic reaction resulting from the use of an electric energy source which is produced electromagnetically.

Various embodiments of the present invention, together with further objects and features of the invention, will be shown throughout the accompanying drawings, wherein:

FIG. 1 is a view partially in section of an electrolytic reaction chamber constructed in accordance with the principles of the invention;

FIG. 2 is an end view taken along lines 2—2 of FIG. 1;

FIG. 3 is a view, partially in section, of an electrolytic reaction chamber provided in accordance with the invention;

FIG. 4 is an elevation view, partly in section, of a modified electrolytic reaction chamber provided in accordance with the invention;

FIG. 5 is an elevation view, partly in section, of a further embodiment of the invention;

FIG. 6 is an enlarged sectional fragmental view of a portion of the embodiment shown in FIG. 5 illustrating certain detailed features thereof;

FIG. 7 is a schematic diagram of a further embodiment of the invention; and

FIG. 8 is a waveform diagram associated with the embodiment of FIG. 7.

Now referring to the embodiment of FIG. 1, there is shown an electromagnet structure 10 having coils 12 and 14 thereabout for generating a field of fixed magnetic polarity between the central pole 15 lying co-axially along the axis of ferromagnetic shaft 16, and the remote pole members 17 and 18 extending on either side of the drum 19 rotated by means of pulley 20. Provision is made in housing 13 which permits the field to extend from the poles 17, 18 through a succession of ferromagnetic shoe members 22 to produce a substantially constant field at the periphery of drum 19. Thus the magnetic field from the external housing 13 will return to the internal pole 15 of the electromagnet 10 through the shell drum 19 arrayed as shown in FIGS. 1 and 2.

Note that this coaxial cylindrical field configuration provides for the continuous movement of test tubes 25 through the magnetic field without changing the polarity of the magnetic field so that a direct current potential gradient is developed through the test tubes 25 which will tend to move charged particles and ions from one end of the tube to the other.

Provision is made near the periphery of drum 19 for receiving a plurality of tubes 25 in recesses. Clips 29 retain the tubes 25 in place. Such tubes 25 are shown in greater detail in FIG. 3 wherein they contain a shell of plastic or non-conducting material having an electrolyte solution therein and having end caps 26 plugged therein. These tubes 25 are inserted in apertures in the rotatable drum 19 and retained by means of spring clips 29, for example, during the rotation of the drum 19 so that they may be easily inserted in or removed from the drum before or after the electrolytic reaction.

It may be seen that the ferromagnetic members 22 serve to distribute the field from poles 17, 18 uniformly in an axial direction through the electrolyte tube 25 on its way to the return path at the central pole 15. Other configurations of the magnetic field could be used by shaping members 22 to concentrate the field at different axial regions and thus to produce a modified potential gradient through the tube. As the drum 19 therefore rotates the tubes 25 in the magnetic field between the pole 15 and the shoe members 22 charged particles will migrate toward the respective ends of the tubes 25 in such a way as to cause a concentration of ions of different polarity near the opposed end caps 26 of the tube or otherwise at opposite surfaces or extremities of the container in a direction perpendicular to the motion. This occurs because the electrolyte has charged particles in the form of free ions therein which are influenced by the magnetic field in such a way that they move in a direction perpendicular to both the magnetic field and the direction of motion. By well-known laws of magnetic fields it is seen therefore that the potential induced in the electrolyte between the two end plates may be fixed by various means such as selecting the strength of the magnetic field or by varying the speed of rotation of the drum within a field of fixed strength.

As may be seen from the foregoing description, the sole power source may constitute this magnetic induction principle, to therefore provide a desired potential gradient through the electrolyte, with a constant rotating speed of drum 19, and cause migration of ions to the appropriate end portions. When plugs 26, existing at the opposite ends of the tube are electrically conductive, they serve as electrodes which may be connected by means of brush members 30 and the two opposite electrodes may be interconnected by a conductive wire at the screw terminals 31 in order to provide a return conductive circuit.

In such a connected device various electrolytic reactions will take place in a somewhat conventional manner depending upon the solution used and the results desired, except that better uniformity of migration of ions is maintained and interface reactions do not affect the potential gradient throughout the solution in the same way. For example, it may be desired to plate a certain metal upon one of the electrode members 26 which would serve as the end product produced by the electrolytic process. The electrode would thus be shaped as desired and placed within an appropriate tube where it would serve as one of the electrodes. An electrolyte containing the desired metal ions and solution would then be placed in the tube, and the other electrode secured in the opposite end of the tube. Upon passing the electrolyte through an appropriate magnetific field a uniform plating action would take place resulting in the electrode having the previously desired shape being coated with the appropriate metal. It is even possible to produce electrolytic reactions without external conduction paths. Even should the end plates 26 be of electrical insulating material for example, the passing of the electrolyte solution through the magnetic field will result in a migration of ions to the vicinity of the plugs and in that region electrolytic reactions will take place in essentially the same manner as when an electrode connected by an external conductive member, although such reactions will occur at a much slower rate.

It is obvious that the same sort of electrolytic reactions could take place for generating gas, or for the purpose of separating two different materials at two opposite poles from an electrolytic solution.

The same sort of reaction may take place in electrolytic reaction chambers of different configurations, such as that shown in FIG. 4. In this case a modified drum structure 19' rotated about shaft 16 has an annular structure 40 which is coaxially arranged in the magnetic field and contains the electrolytic solution with annular plugs 41 in each end thereof. The magnetic poles 15' and 22' are fixed relative to the rotation of the drum 19' so that in this case the solution is moved continuously through the fixed material field by rotation of the drum 19' and the annular non-conductive container ring member 40. This provides for a continuous electrolytic reaction proceeding around the anunlar surface of the end plug member 41 for example.

Much the same results may also be obtained from a still further configuration shown in FIG. 5 wherein an external pump 50 is used for moving electrolyte from one end to the other of a helical conduit container 51 wound around a stationary drum 52 which is disposed to hold the helical conduit 51 in the flux path between magnetic field members 15" and 22". In the same manner therefore the relative motion between the electrolyte as it is pumped through the helical conduit and the fixed magnetic field will provide an electric field which forces the ions laterally toward either side of the helical conduit as may be seen in more detail from FIG. 6 where conductors 53 and 54 are respectively placed as electrodes, if desired. It is additionally possible in this particular embodiment to provide for a selective pumping of the materials through the helical path by providing diaphragm 55 intermediate helical conduit 51 in such a way that although ions may freely pass through the diaphragm 55, the solution being passed longitudinally through the conduit by the pump 50 will tend to remain segregated on either side of the diaphragm surface. In such a configuration two pumping paths could be used for the two segregated solutions.

The configuration of FIG. 7 uses the foregoing principle of inducing ion motion by influence of a magnetic field. Thus the electrolyte in tube 25' has free ions in a semi-mobile state, that can be moved once they have a force exerted which exceeds friction and viscosity which holds them in place. Thus when primary winding 71 is wound with the electrolyte in tube 25' serving as a secondary winding, the primary winding generates a potential difference within the electrolyte in the tube 25' to cause the ion migration toward the respective ends of the tube of electrolyte when a change in rate of current flow exists in the primary.

Assume the sawtooth current generator 72 of FIG. 7 is connected to coil 71, and generates the pulse waveform 75–76 above and below the neutral line 73 shown in FIG. 8, which represents the potential exerted in tube 25 by action of the magnetic field. Thus whenever the voltage waveform 75 exceeds the potential 74 it will cause ions to move against the inertia or viscosity of the electrolyte tending to hold the ions in place. By application of the sawtooth, voltage 76 will be kept below a threshold value to cause motion of ions mainly in one direction, rather than equal oscillation back and forth. Thus, essentially the same result may be obtained in processing chemicals with an individual electric field as in the other configuration.

It is also to be understood in accordance with the teachings of this invention that various other configurations and embodiments utilizing the relative motion of an electrolytic solution with the lines of flux of a magnetic field may be used, and thereby may be within the scope of this invention which is defined in the accompanying claims.

It is apparent from the foregoing specification that there is provided herewith a form of electrolytic reaction which provides improved results over those methods of electrolytic reaction in the prior art which depended upon a source of direct current supplied externally to a pair of electrodes as the sole energy source. Although it is to be recognized that the present invention may be used for various types of electrolytic reactions, the following plating procedure, which has been accomplished by the present method, is typical of those that may be reproduced with improved results. Considering the embodiment of FIGS. 1, 2 and 3, a one-quarter inch inside diameter plastic tube three and three-quarters inches long was used in a slot in the periphery of a five and one-half inch diameter drum revolving at a speed of twenty-seven hundred revolutions per minute. The electrolyte was a saturated stannous chloride solution with a suspension of the same, and the plugs at each end of the tube were copper. In this manner of rotating the solution through the magnetic field, one end plug became coated with metallic tin.

It was noted that when the voltage measured between the two end terminals was monitored that the voltage decreased during the five minute run exemplified from a starting voltage of .52 volt to a terminal voltage of .41 volt. This demonstrates another outstanding feature of the current invention, since when using an external source of direct current such as an external battery connected to the electrodes for achieving electroplating in the conventional way, the voltage across the electrodes necessary to maintain the electroplating process will increase rather than decrease as polarization occurs.

Thus it is clear that the presently described novel mode of operation provides unique means and methods in separation processes by causing relative migration of charged bodies and solutions to conduct chemical reactions and physical separations, i.e., electrolysis, electrophoresis, electro-dialysis, and electro-osmosis, which may be used in many instances when conventional electrolytic reactions and physical separations with a current externally applied through electrodes is not satisfactory.

Having therefore described the present invention, its mode of operation, and several embodiments thereof in detail, those features believed descriptive of the invention and its nature are defined with particularity in the following claims.

What is claimed is:

1. Apparatus for causing migration of particles selected from the group consisting of ions and electrically charged particles suspended in a solution by passing said solution through a magnetic field comprising in combination means for generating in a confined fixed area a magnetic field which is generally radial with respect to a fixed axis, container means comprising at least one electrically non-conducting container for confining said solution within said magnetic field, electrically conductive means on opposite sides of said container means for contact with said solution and electrically connecting the opposite sides of said solution, and means for rotating said magnetic field and said solution in said container with respect to each other about said axis whereby said magnetic field is cut by said solution and said particles in said solution are urged towards the opposite sides of said container means.

2. Apparatus as defined in claim 1 wherein said electrically conductive means comprises conductors on opposite sides of said container means and a conductive circuit external to the electrolyte coupling the conductors together.

3. Apparatus as defined in claim 1 wherein the magnetic field is in a coaxial cylindrical configuration and said container means comprises a plurality of containers mounted on said rotary member to be moved through the field.

4. Apparatus as defined in claim 1 wherein the magnetic field is in a coaxial cylindrical configuration and the container means comprises a cylinder container coaxially inserted in said field for rotation.

5. Apparatus as defined in claim 1 wherein the container means is stationary within said field and said rotating means comprises pumping means for pumping the solution through said container means.

6. Apparatus for causing migration of particles selected from the group consisting of ions and electrically charged particles suspended in a solution by passing said solution through a magnetic field comprising in combination means for generating a magnetic field which is generally radial with respect to a fixed axis, container means for confining said solution within said magnetic field, said container means comprising a spiral pipe arranged about said fixed axis, electrically conductive means on opposite sides of said container means for contact with said solution and electrically connecting the opposite sides of said solution, and means for moving said magnetic field and said solution in said spiral pipe with respect to each other about said axis whereby said magnetic field is cut by said solution and said particles in said solution are urged towards the opposite sides of said container means.

7. A process for causing migration of particles selected from the group consisting of ions and electrically charged particles suspended in a solution of electrolyte comprising generating in a fixed area a magnetic field which is generally radial with respect to a fixed axis and rotating said magnetic field and at least one body of said solution, while opposite sides of said body of solution are electrically connected, with respect to each other about said fixed axis with said body of solution passing through and cutting said magnetic field, said rotating being at such speed and continuously to cause said particles in said solution to be urged towards said opposite sides of said body of solution.

8. A process as claimed in claim 7 comprising generating in a fixed area a magnetic field in a coaxial cylindrical configuration with respect to said fixed axis.

9. A process as claimed in claim 7 comprising causing a plurality of bodies of said solution to rotate about said fixed axis.

10. A process for causing migration of particles selected from the group consisting of ions and electrically charged particles suspended in a solution of electrolyte comprising generating in a fixed area a magnetic field which is generally radial with respect to a fixed axis and causing a body of said solution while opposite sides of said body of solution are electrically connected to move along a spiral path about said axis through said generally radial magnetic field at such speed and continuously to cause said particles in said solution to be urged towards said opposite sides of said body of solution.

11. Apparatus as defined in claim 1 wherein said means for generating a magnetic field is stationary and said rotating means rotates said container means and solution contained therein through said magnetic field.

12. A process as claimed in claim 7 wherein said magnetic field is maintained stationary and said body of solution is rotated through said stationary magnetic field.

References Cited

UNITED STATES PATENTS

| | | | |
|---|---|---|---|
| 2,842,490 | 7/1958 | Friel | 204—156 |
| 3,356,601 | 12/1967 | Inoue | 204—156 |
| 3,140,714 | 7/1964 | Murphy et al. | 128—214 |
| 3,368,968 | 2/1968 | Ruskin | 210—42 |

FOREIGN PATENTS 852,733  11/1960  Great Britain.

OTHER REFERENCES

Ellis: "Fresh Water From the Ocean" (1954), pp. 40–43 and 62–65.

Nernst: "Theoretical Chemistry" (1895), pp. 320 and 321.

Robinson et al.: "Electrolyte Solutions," 2nd ed., 1959, pp. 118 and 119.

Hopkins: "Expr. Electrochem.," 1905, pp. 54–61.

JOHN H. MACK, Primary Examiner

A. C. PRESCOTT, Assistant Examiner

U.S. Cl. X.R.

204—149, 155, 156; 210—42, 222